US012607126B2

(12) United States Patent
Massaro et al.

(10) Patent No.: US 12,607,126 B2
(45) Date of Patent: Apr. 21, 2026

(54) SYMMETRICAL TWO-PIECE HOLLOW-VANE ASSEMBLY JOINED VIA BRAZING ALONG AIRFOIL CENTERLINE

(71) Applicant: Raytheon Technologies Corporation, Farmington, CT (US)

(72) Inventors: Matthew Michael Massaro, Wilmington, DE (US); David E. Bitter, Chester, CT (US); Lucas O. McCaslin, Middletown, CT (US); William John Oldach, West Hartford, CT (US); William C. Sheridan, East Haddam, CT (US); Bryan A. L. Hofferd, Middlefield, CT (US)

(73) Assignee: RTX Corporation, Farmington, CT (US)

( * ) Notice: Subject to any disclaimer, the term of this patent is extended or adjusted under 35 U.S.C. 154(b) by 159 days.

(21) Appl. No.: 18/223,059

(22) Filed: Jul. 18, 2023

(65) Prior Publication Data

US 2025/0027416 A1 Jan. 23, 2025

(51) Int. Cl.
| | |
|---|---|
| *F01D 5/18* | (2006.01) |
| *B22F 5/04* | (2006.01) |
| *B23K 1/00* | (2006.01) |
| *F01D 5/14* | (2006.01) |
| *F01D 17/16* | (2006.01) |

(52) U.S. Cl.
CPC .............. *F01D 5/18* (2013.01); *B23K 1/0018* (2013.01); *F01D 5/147* (2013.01); *F01D 17/162* (2013.01); *B22F 5/04* (2013.01); *F05D 2230/237* (2013.01); *F05D 2250/72* (2013.01)

(58) Field of Classification Search
CPC .......... F01D 5/18; F01D 5/147; F01D 17/162; B23K 1/0018; B22F 5/04; F05D 2230/237; F05D 2250/72; B22C 9/24
See application file for complete search history.

(56) References Cited

U.S. PATENT DOCUMENTS

| | | | | | |
|---|---|---|---|---|---|
| 1,937,966 A | * | 12/1933 | Junkers | ................... | B64C 11/20 |
| | | | | | 416/233 |
| 2,457,202 A | * | 12/1948 | Brady | .................... | B21D 53/78 |
| | | | | | 29/889.6 |
| 2,514,525 A | * | 7/1950 | Stulen | .................... | B23K 28/02 |
| | | | | | 416/223 R |
| 2,807,437 A | * | 9/1957 | Roush | ........................ | B22F 7/06 |
| | | | | | 228/159 |
| 3,736,638 A | * | 6/1973 | Stone, Jr. | ................. | B21K 3/04 |
| | | | | | 416/213 R |

(Continued)

FOREIGN PATENT DOCUMENTS

| | | |
|---|---|---|
| CN | 102418603 A | 4/2012 |

OTHER PUBLICATIONS

Extended European Search Report for counterpart EP application No. 24188939.3 dated Nov. 28, 2024.

*Primary Examiner* — Matthew T Largi
(74) *Attorney, Agent, or Firm* — Bachman & LaPointe, P.C.

(57) ABSTRACT

A hollow vane assembly including an open body including an interior; at least one cover support structure formed in said open body proximate the interior; a cover brazed to the open body to form at least one flow passage; and the open body and the cover configured as two piece substantially symmetrical halves.

20 Claims, 5 Drawing Sheets

(56) References Cited

U.S. PATENT DOCUMENTS

| | | | | |
|---|---|---|---|---|
| 4,391,684 | A * | 7/1983 | Goddard | B23H 9/12 |
| | | | | 205/649 |
| 4,883,404 | A | 11/1989 | Sherman | |
| 5,392,515 | A * | 2/1995 | Auxier | B23P 15/04 |
| | | | | 29/889.721 |
| 7,311,497 | B2 * | 12/2007 | Sharma | F01D 5/187 |
| | | | | 29/889.7 |
| 7,322,796 | B2 | 1/2008 | Pietraszkiewicz et al. | |
| 7,993,105 | B2 * | 8/2011 | Weisse | F04D 29/384 |
| | | | | 416/223 R |
| 10,458,249 | B2 * | 10/2019 | McCaffrey | F02C 7/12 |
| 11,014,190 | B2 * | 5/2021 | Malmborg | B21D 53/78 |
| 11,639,685 | B1 * | 5/2023 | Zheng | F01D 5/16 |
| | | | | 415/119 |
| 11,867,084 | B1 * | 1/2024 | Pickens | F01D 9/044 |
| 2008/0134685 | A1 * | 6/2008 | Bunker | F23R 3/20 |
| | | | | 60/776 |
| 2013/0320073 | A1 * | 12/2013 | Yokoo | C21D 9/0068 |
| | | | | 228/233.2 |
| 2017/0074116 | A1 * | 3/2017 | Spangler | F01D 9/04 |
| 2020/0018171 | A1 * | 1/2020 | Stiehler | B22F 10/28 |
| 2020/0215642 | A1 * | 7/2020 | Malmborg | F01D 5/18 |
| 2021/0268613 | A1 * | 9/2021 | Henderkott | B23K 11/18 |
| 2023/0017328 | A1 * | 1/2023 | Chong | F01D 9/065 |

* cited by examiner

200

SYMMETRICAL TWO-PIECE HOLLOW-VANE ASSEMBLY JOINED VIA BRAZING ALONG AIRFOIL CENTERLINE

BACKGROUND

The present disclosure is directed to a hollow vane comprised of two approximately symmetrical halves that are split along the vane centerline and joined to form a desired geometry.

Hollow vanes are typically utilized to enable air, either hot or cold, to flow through the part to achieve a desired thermal effect. Historically, hollow vanes have been manufactured by casting the external airfoil shape with cores located internally within the mold. This method results in a hollow cavity within the cast part, however, castings, from both a process capability and supplier willingness perspectives, are not capable of meeting the dimensional and material requirements as demanded by the engine operating environment.

What is needed is a vane with symmetrical halves that enables the selection of manufacturing method that meets the geometric requirements of the hardware while reducing the metallurgical shortfalls imposed while casting hollow vanes.

SUMMARY

In accordance with the present disclosure, there is provided a process of creating a hollow vane assembly comprising: forming an open body, the open body including an interior; forming at least one cover support structure in said open body proximate the interior; forming a cover, the cover being configured to attach to the open body to form at least one flow passage; forming the open body and the cover as two piece substantially symmetrical halves; and brazing the cover to the open body.

A further embodiment of any of the foregoing embodiments may additionally and/or alternatively include the process further comprising forming an airfoil from the combination of the open body brazed together with the cover.

A further embodiment of any of the foregoing embodiments may additionally and/or alternatively include the process further comprising forming at least one of the open body and the cover by a manufacturing process selected from the group consisting of casting, additive manufacturing and machining.

A further embodiment of any of the foregoing embodiments may additionally and/or alternatively include the process further comprising forming the symmetrical halves along a centerline of the hollow vane assembly.

A further embodiment of any of the foregoing embodiments may additionally and/or alternatively include the process further comprising forming a dual walled structure having contoured surfaces.

A further embodiment of any of the foregoing embodiments may additionally and/or alternatively include the process further comprising forming a braze joint for joining the symmetrical halves along a centerline of the hollow vane assembly.

A further embodiment of any of the foregoing embodiments may additionally and/or alternatively include the process further comprising forming a braze joint on either side of a centerline within a range of about 1% to about 25% of a thickness of an airfoil formed by the symmetrical halves.

In accordance with the present disclosure, there is provided a hollow vane assembly comprising an open body including an interior; at least one cover support structure formed in said open body proximate the interior; a cover brazed to the open body to form at least one flow passage; and the open body and the cover configured as two piece symmetrically divided halves.

A further embodiment of any of the foregoing embodiments may additionally and/or alternatively include the hollow vane assembly further comprising a braze joint attaches the symmetrically divided halves along a centerline of the hollow vane assembly.

A further embodiment of any of the foregoing embodiments may additionally and/or alternatively include the braze joint attaches the at least one cover support structure formed in the open body and the cover.

A further embodiment of any of the foregoing embodiments may additionally and/or alternatively include a braze joint is located on either side of a centerline within a range of about 1% to about 25% of an airfoil thickness.

A further embodiment of any of the foregoing embodiments may additionally and/or alternatively include the cover comprises at least one cover support structure.

A further embodiment of any of the foregoing embodiments may additionally and/or alternatively include a dual walled structure having contoured surfaces is formed from the two piece symmetrically divided halves.

A further embodiment of any of the foregoing embodiments may additionally and/or alternatively include the combination of the open body brazed together with the cover configured as two piece symmetrically divided halves form an airfoil.

In accordance with the present disclosure, there is provided a process for improving the stress capability between a cover and an open body for a hollow vane assembly comprising forming an open body, the open body includes a leading edge opposite a trailing edge, the open body includes a pressure side and suction side opposite the pressure side, the open body including an interior; forming a cover, the cover being configured to couple with the open body proximate a centerline of the hollow vane assembly to form at least one flow passage; configuring the open body and the cover as two piece symmetrically divided halves; and attaching the cover to the open body.

A further embodiment of any of the foregoing embodiments may additionally and/or alternatively include the process further comprising attaching the symmetrically divided halves along a centerline of the hollow vane assembly via a braze joint.

A further embodiment of any of the foregoing embodiments may additionally and/or alternatively include the process further comprising attaching the at least one cover support structure formed in the open body and the cover via the braze joint.

A further embodiment of any of the foregoing embodiments may additionally and/or alternatively include the process further comprising forming an airfoil from the combination of the open body together with the cover configured as two piece symmetrically divided halves.

A further embodiment of any of the foregoing embodiments may additionally and/or alternatively include the process further comprising locating a braze joint on either side of a centerline of the hollow vane assembly within a range of about 1% to about 25% of a thickness of the airfoil.

A further embodiment of any of the foregoing embodiments may additionally and/or alternatively include the process further comprising forming at least one cover support structure in the cover.

Other details of the hollow vane assembly are set forth in the following detailed description and the accompanying drawings wherein like reference numerals depict like elements.

DETAILED DESCRIPTION

Figure 1:
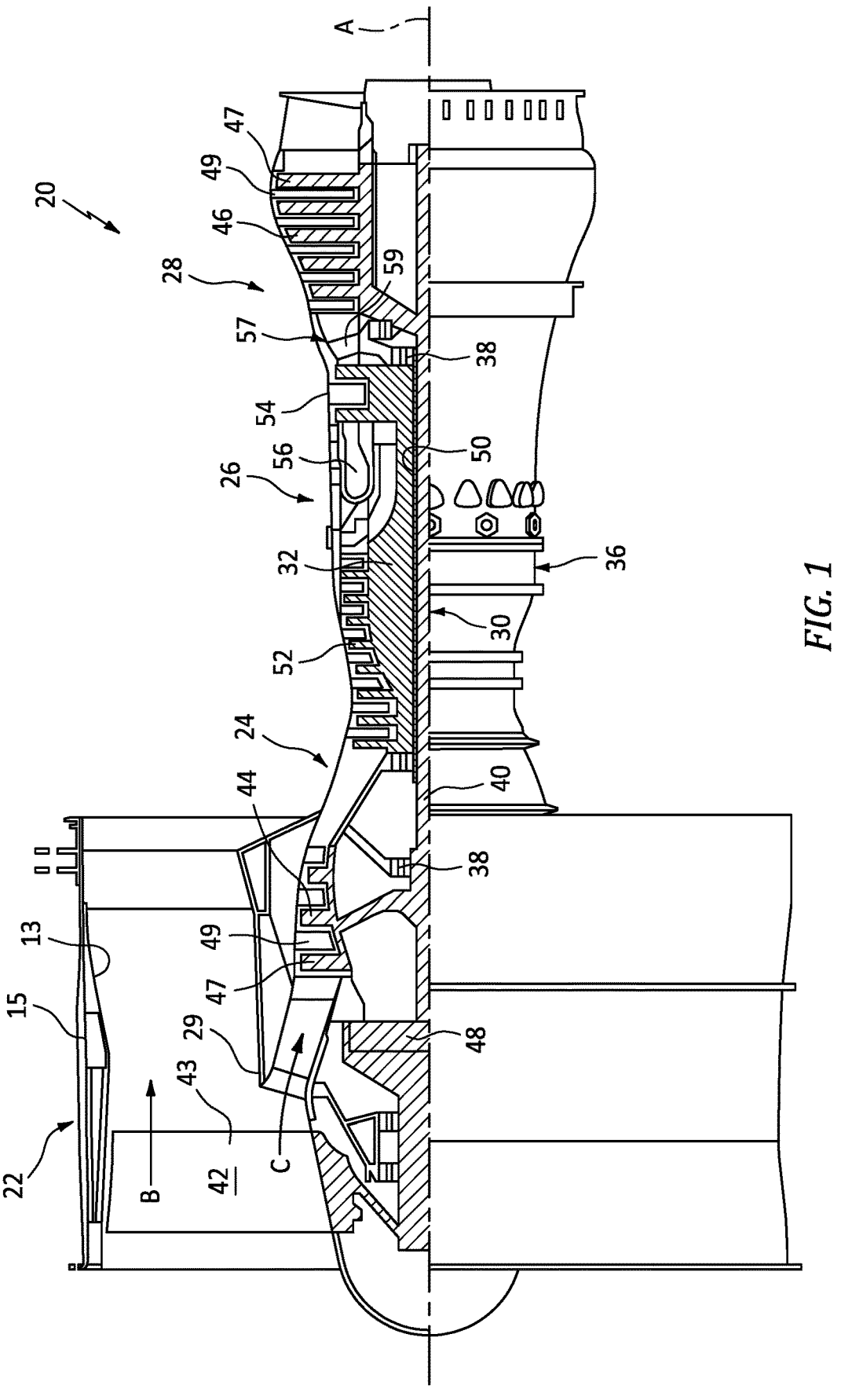
FIG. 1 is a cross section view of an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent the rotatable airfoils. The rotatable airfoils and vanes are schematically indicated at 47 and 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of pounds-mass per hour lbm/hr of fuel flow rate being burned divided by pounds-force lbf of thrust the engine produces at that minimum point. The engine parameters described above, and those in the next paragraph are measured at this condition unless otherwise specified.

"Low fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The low fan pressure ratio is a spanwise average of the pressure ratios measured across the fan blade 43 alone over radial positions corresponding to the distance. The low fan pressure ratio can be less than or equal to 1.45, or more narrowly greater than or equal to 1.25, such as between 1.30 and 1.40. "LOW corrected fan tip speed" is the actual fan tip speed in ft/sec divided by an industry standard temperature correction of $[(\text{Tram}° \text{ R})/(518.7° \text{ R})]^{0.5}$. The "low corrected fan tip speed" can be less than or equal to 1150.0 ft/second (350.5 meters/second), and greater than or equal to 1000.0 ft/second (304.8 meters/second).

Figures 2, 3:
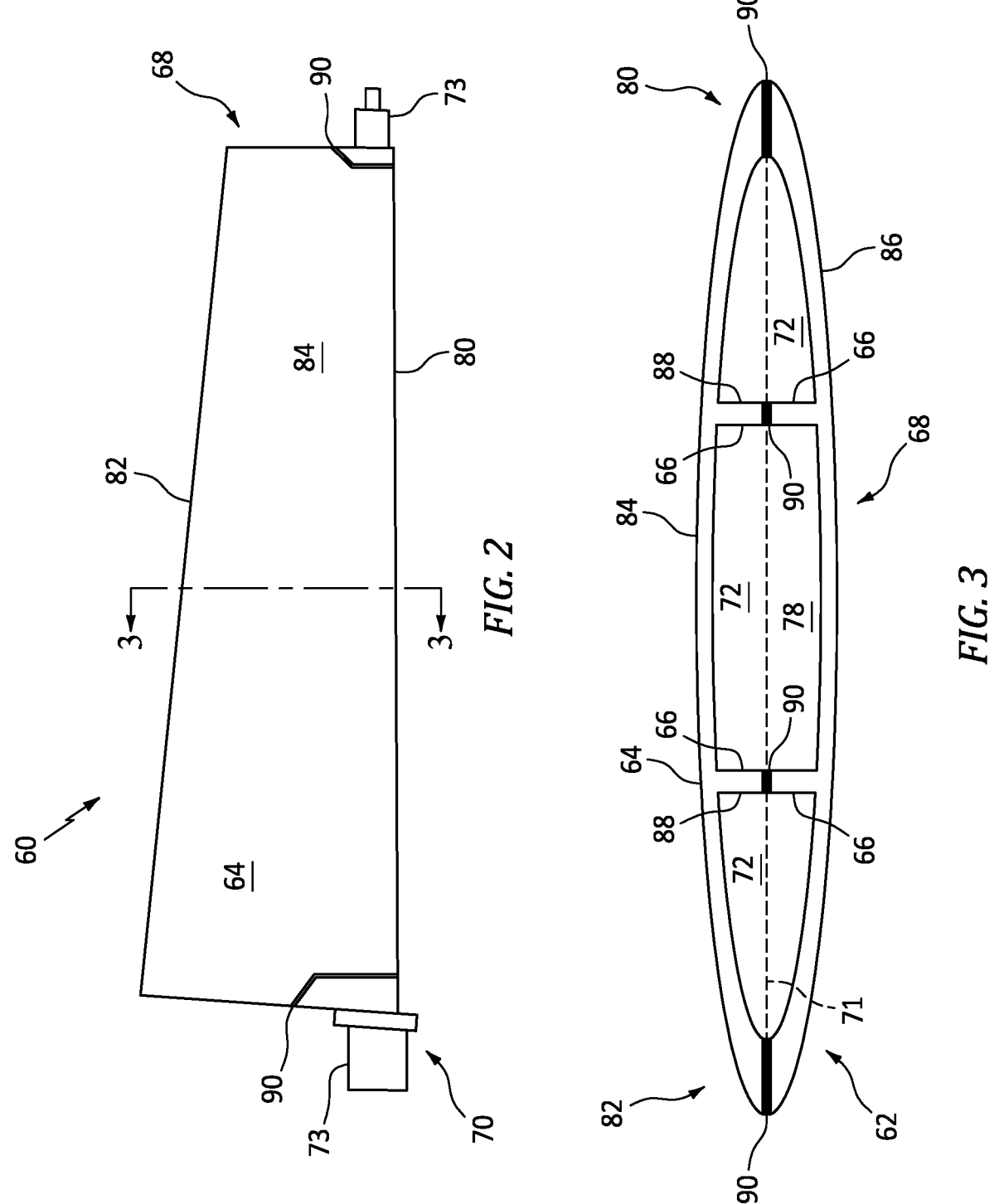
FIG. 2 is a schematic representation of an exemplary vane assembly.
FIG. 3 is a cross-sectional schematic representation of an exemplary vane assembly of FIG. 2.
Figure 4:
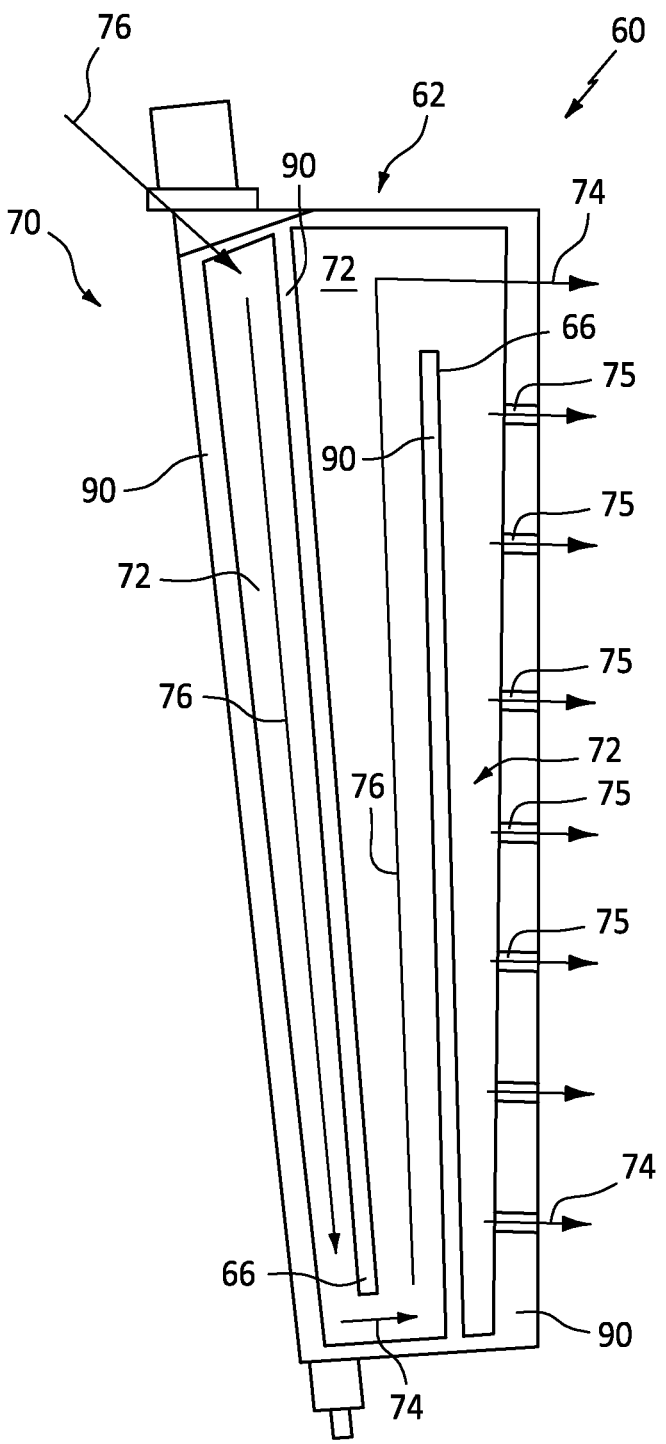
FIG. 4 is a schematic representation of an exemplary vane body.

Referring also to FIG. 2, FIG. 3 and FIG. 4 showing an exemplary two piece hollow-vane assembly 60. The hollow-vane assembly 60 includes an open body 62 that can be a two piece design of approximately symmetrical halves, that is, symmetrically divided such that the connecting joint is located in a low stress area. The two piece hollow-vane assembly 60 includes a cover 64 that is attachable to open body 62. The open body 62 and cover 64 include cover support structure(s) 66. The open body 62 and cover 64 are combined to form an airfoil 68 of a vane 70 when brazed together. The two halves can be split along a vane centerline or midline 71. It is contemplated that the hollow-vane assembly 60 can also be configured as other dual walled structures having contoured surfaces, such as a turbine blade. The hollow-vane assembly 60 can include a three dimensionally contoured shape. The three dimensional contoured surface can refer to a surface defined by an X, Y, and Z axis. The three dimensional contoured surface can vary from point to point to include surface variation of X, Y and Z coordinates. The vane assembly 60 can include trunnions 73 and cooling/heating holes 75 formed in the open body 62.

The vane assembly 60 is shown with representative fluid flow passages 72 with flow arrow 74. The flow arrow 74 shows an exemplary cooling/heating fluid 76 flow through the fluid flow passages 72 at the interior 78 formed by the open body 62 and cover 64. The flow passages 72 can be configured as multiple cooling channels 72 that allow for cooling fluid 76 to flow through the interior 78.

The open body 62 and cover 64 can be constructed from rigid materials, such as a metal alloy and in alternative embodiments, from heat resistant super alloy composition, nickel-based, or cobalt based compositions. The open body 62 and cover 64 can be made of the same material or different materials.

Referring also to FIG. 3, vane assembly 60 is shown as a cross-section of FIG. 1. The open body 62 can be formed from a casting, for example. The open body 62 can include a leading edge 80 opposite a trailing edge 82, a pressure side 86 and suction side 84 opposite the pressure side 86 (FIG. 2). The open body 62 including the cover support structures 66 allow for the formation of the flow passages 72. The cover support structure 66 can form an interior wall 88. The cover support structure 66 can be raised surface features of the open body 62 and cover 64. The cover support structure 66 can extend from the open body 62 and cover 64 distally.

The cover support structure 66 can form parts of the flow passages 72 along with the cover 64 and open body 62. The open body 62 and cover 64 with integral cover support structure(s) 66 can be manufactured via a manufacturing process that supports the geometric and material capability needs of the vane 60. Potential manufacturing options for the open body 62 can include casting, additive manufacturing, or conventional machining.

Once the open body 62 is manufactured all surfaces of the vane 60, including the now exposed interior 78 of the open body 62, can be post processed to achieve the desired metallurgical properties.

In parallel to the manufacturing of the open body 62, the cover 64 can be fabricated. In addition to the manufacturing options available for the open body 62 the cover 64 can be formed to the desired geometry via conventional metal forming methods like stamping, deep drawing, or hydro-forming, and machining via multi-axis CNC.

Figure 5:
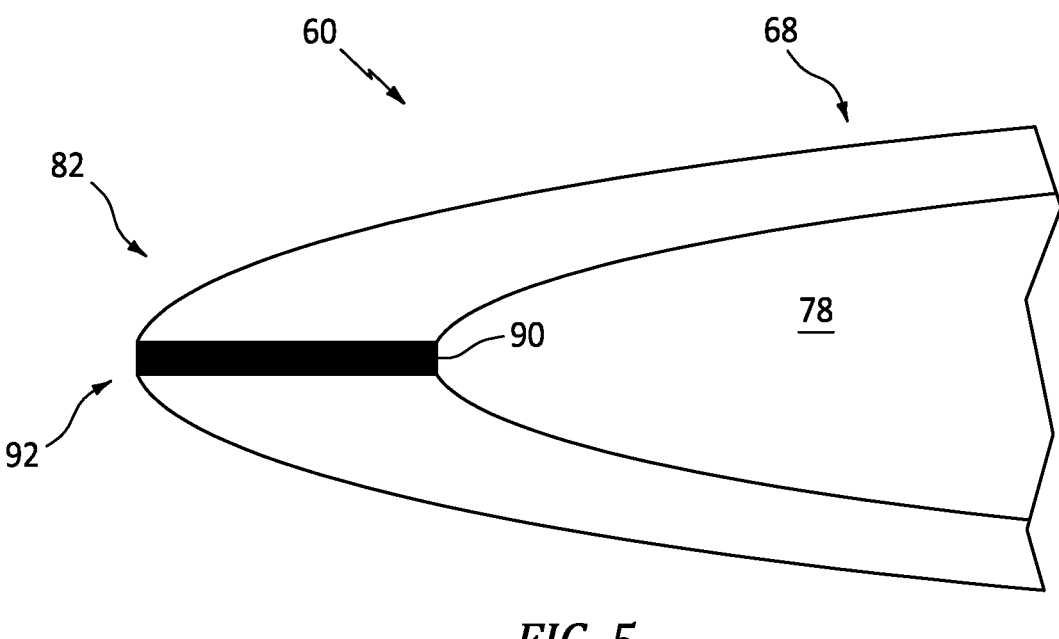
FIG. 5 is a partial cross-sectional schematic representation of an exemplary vane assembly of FIG. 3.
Figure 6:
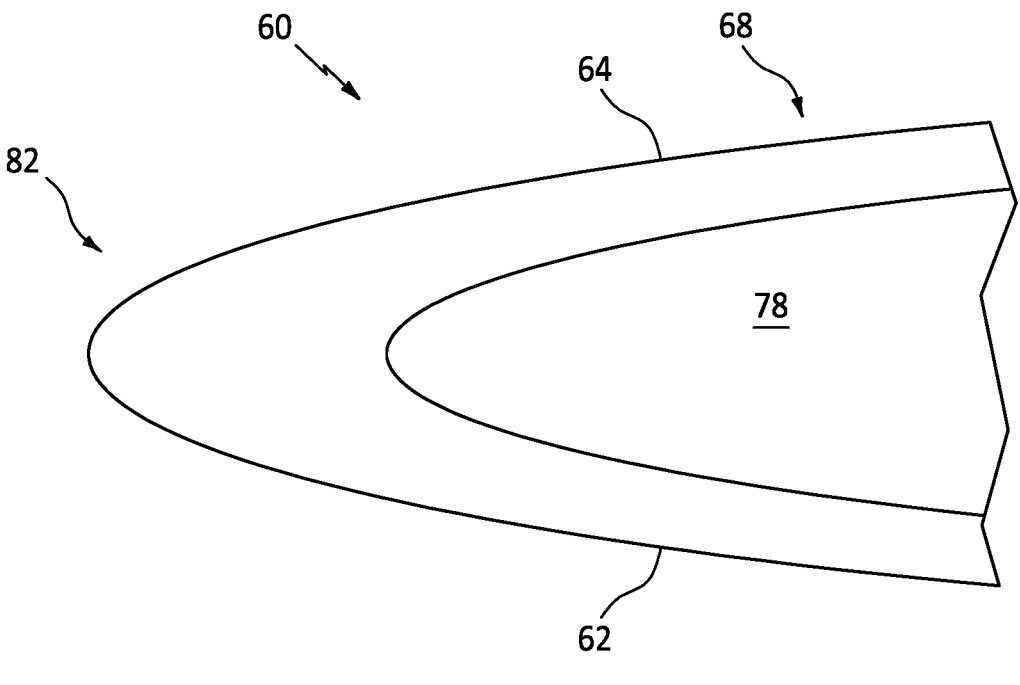
FIG. 6 is a partial cross-sectional schematic representation of an exemplary vane assembly of FIG. 5.

Referring also to FIG. 5 and FIG. 6, the cover 64 can be attached to the open body 62 via a variety of techniques, such as laser welding or brazing with structural brazing joints 90. The geometry of the structural brazing joints 90 is dictated by the location along the vane assembly 60 at the centerline/midline 71. Brazing along the airfoil centerline 71 ensures that brazes are performed along uniform flat surfaces inside the airfoil 68. The structural brazing joints 90 can be placed away from stress concentrating features like fillets. Brazing along lower-stressed areas of the airfoil 68 can help ensure the structural integrity of the airfoil 68 because the brazing joint 90 may have a structural capacity that does not match the material of the open body 62 or cover 64. For example, shown in FIG. 3, the brazing joint 90 is located proximate the leading edge 80, the trailing edge 82 and at the junction of the cover support structures 66. The leading edge 80 can include a structural seam 92 that can be filled and polished flush for aero considerations. FIG. 6 represents the two piece hollow vane assembly 60 as one uniform body after the joining process is completed.

In an exemplary embodiment, the brazing joint 90 can be located on either side of the centerline 71 within a range of about 1% to 25% of the overall airfoil thickness. In another exemplary embodiment the brazing joint 90 can be located within a range of about 1% to about 10% of thickness of the airfoil on either side of the centerline 71.

Similarly to the open body 62, post processing of all part surfaces may be performed on the cover 64 to achieve the desired metallurgical properties.

With both the open body 62 and cover 64 fabrication completed the cover 64 can be permanently joined to the open body 62 via brazing. Any subsequent heat treatment, final finishing, inspections, etc. can follow the brazing.

Figure 7:
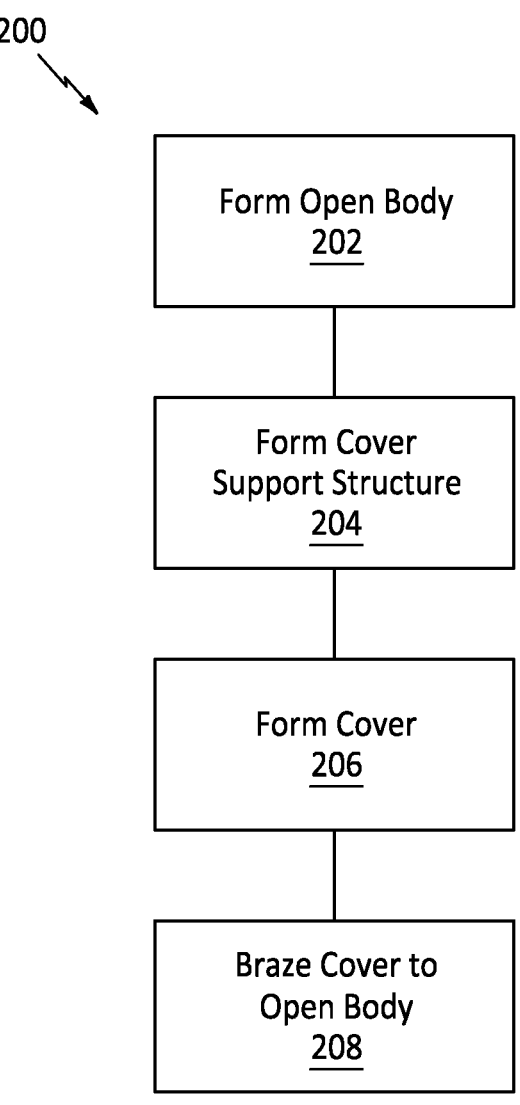
FIG. 7 is an exemplary process map.

Referring also to FIG. 7 a process map showing the process 200. The process 200 can include the step 202 of forming the open body 62. The next step 204 can include forming the cover support structure 66 in the open body 62. The next step 206 can include forming the cover 64. The next step 208 can include brazing the cover 64 to the open body 62. The cover support structure 66 can be coupled to the cover 64 by brazing.

A technical advantage of the disclosed hollow vane assembly includes the selection of a manufacturing method that meets the geometric requirements of the hardware while reducing the metallurgical shortfalls imposed by when casting hollow vanes.

Another technical advantage of the disclosed hollow vane assembly includes direct machining access within the internal passageways of the vane.

Another technical advantage of the disclosed hollow vane assembly includes capacity to optimize the geometry for strength/weight.

Another technical advantage of the disclosed hollow vane assembly includes a hollow airfoil configured to flow heating or cooling air.

Another technical advantage of the disclosed hollow vane assembly includes a hollow airfoil design that reduces part weight.

Another technical advantage of the disclosed hollow vane assembly includes the capacity to move the braze joint to a location that is lower in stress.

Another technical advantage of the disclosed hollow vane assembly includes the location of the braze joint that has a lower chance of part failure due to structural shortfalls at the braze joint.

Another technical advantage of the disclosed hollow vane assembly includes machining access that allows for easier machining of rib fillets, since the rib fillets no longer need to be machined as blind fillets.

There has been provided a hollow vane assembly. While the hollow vane assembly has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A process of creating a hollow vane assembly comprising:
   forming an open body, the open body including an interior;
   forming at least one cover support structure in said open body proximate the interior;
   forming a cover, the cover being configured to attach to the open body to form at least one flow passage;
   forming the open body and the cover as symmetrical halves; and
   brazing the cover to the open body, wherein the hollow vane assembly is a gas turbine engine hollow vane assembly.

2. The process according to claim 1, further comprising:
   forming an airfoil by brazing the open body together with the cover.

3. The process according to claim 1, further comprising:
   forming at least one of the open body and the cover by a manufacturing process selected from the group consisting of casting, additive manufacturing and machining.

4. The process according to claim 1, further comprising:
   forming the symmetrical halves along a centerline of the hollow vane assembly.

5. The process according to claim 1, further comprising:
   forming a dual walled structure having contoured surfaces.

6. The process according to claim 1, further comprising:
   forming a braze joint for joining the symmetrical halves along a centerline of the hollow vane assembly.

7. The process according to claim 1, further comprising:
   forming a braze joint on either side of a centerline within a range of about 1% to about 25% of a thickness of an airfoil formed by the symmetrical halves.

8. A hollow vane assembly comprising:
   an open body including an interior;
   at least one cover support structure formed in said open body proximate the interior;
   a cover brazed to the open body to form at least one flow passage; and
   the open body and the cover configured as symmetrically divided halves, wherein the hollow vane assembly is a gas turbine engine hollow vane assembly.

9. The hollow vane assembly according to claim 8, further comprising:
   a braze joint attaches the symmetrically divided halves along a centerline of the hollow vane assembly.

10. The hollow vane assembly according to claim 9, wherein the braze joint attaches the at least one cover support structure formed in the open body and the cover.

11. The hollow vane assembly according to claim 8, wherein a braze joint is located on either side of a centerline within a range of about 1% to about 25% of an airfoil thickness.

12. The hollow vane assembly according to claim 8, wherein the cover comprises the at least one cover support structure.

13. The hollow vane assembly according to claim 8, wherein a dual walled structure having contoured surfaces is formed from the symmetrically divided halves.

14. The hollow vane assembly according to claim 8, wherein the open body brazed together with the cover form an airfoil.

15. A process for improving the stress capability between a cover and an open body for a hollow vane assembly comprising:
   forming the open body, the open body includes a leading edge opposite a trailing edge, the open body includes a pressure side and suction side opposite the pressure side, the open body including an interior;
   forming the cover, the cover being configured to couple with the open body proximate a centerline of the hollow vane assembly to form at least one flow passage;
   configuring the open body and the cover as symmetrically divided halves; and
   attaching the cover to the open body, wherein the hollow vane assembly is a gas turbine engine hollow vane assembly.

16. The process of claim 15, further comprising:
   attaching the symmetrically divided halves along a centerline of the hollow vane assembly via a braze joint.

17. The process of claim 15, further comprising:
   attaching the at least one cover support structure formed in the open body and the cover via a braze joint.

18. The process of claim 15, further comprising:
   forming an airfoil from by combining the open body together with the cover configured as symmetrically divided halves.

19. The process of claim 18, further comprising:

locating a braze joint on either side of a centerline of the hollow vane assembly within a range of about 1% to about 25% of a thickness of the airfoil.

20. The process of claim 15, further comprising:

forming at least one cover support structure in the cover.

* * * * *